United States Patent
Tennoe et al.

(10) Patent No.: US 12,435,825 B2
(45) Date of Patent: Oct. 7, 2025

(54) PIPE-IN-PIPE PIPELINES

(71) Applicant: TECHNIP N-POWER, Courbevoie (FR)

(72) Inventors: Andreas Tennoe, Oslo (NO); Valeriy Shepenkov, Oslo (NO)

(73) Assignee: TECHNIPFMC SUBSEA FRANCE (FR)

( * ) Notice: Subject to any disclaimer, the term of this patent is extended or adjusted under 35 U.S.C. 154(b) by 0 days.

(21) Appl. No.: 18/254,835

(22) PCT Filed: Nov. 30, 2021

(86) PCT No.: PCT/IB2021/000826
§ 371 (c)(1),
(2) Date: May 26, 2023

(87) PCT Pub. No.: WO2022/112845
PCT Pub. Date: Jun. 2, 2022

(65) Prior Publication Data
US 2024/0003475 A1    Jan. 4, 2024

(30) Foreign Application Priority Data

Nov. 30, 2020 (GB) ..................... 2018785

(51) Int. Cl.
*F16L 39/00* (2006.01)
*F16L 9/19* (2006.01)

(52) U.S. Cl.
CPC ............... *F16L 39/005* (2013.01); *F16L 9/20* (2013.01)

(58) Field of Classification Search
CPC .................. F16L 39/005; F16L 9/20
See application file for complete search history.

(56) References Cited

U.S. PATENT DOCUMENTS 236,519 A * 1/1881 Walsh ................... F16L 39/005
285/356
3,834,341 A * 9/1974 Sexton ................... F16L 39/005
440/89 C (Continued)

FOREIGN PATENT DOCUMENTS

DE   2647782 A1   4/1978
DE   4202079 A1   7/1993

(Continued)

OTHER PUBLICATIONS

Combined Examination and Search Report dated May 24, 2021, issued in corresponding GB Patent Application No. GB2018785.2.

(Continued)

*Primary Examiner* — Matthew Troutman
*Assistant Examiner* — Fannie Kee
(74) *Attorney, Agent, or Firm* — OSTROLENK FABER LLP (57) ABSTRACT

A pipe-in-pipe (PIP) pipeline assembly for the transport of a fluid in a marine environment that includes:
 (a) a PIP pipeline length comprising at least metal inner and outer pipes and an annular space thereinbetween, the inner metal pipe having an internal diameter;
 (b) a PIP bulkhead, having
  a first end connected to an end of the PIP pipeline length and comprising at least a metal inner pipe with a first internal diameter, an outer pipe, and an annular space thereinbetween, and
  a second end comprising an outer pipe with a second internal diameter, and being able to be joined to a second end of a second PIP bulkhead,
  wherein the second internal diameter of the second end is greater than the first internal diameter of the first end of the PIP bulkhead.

24 Claims, 8 Drawing Sheets

(56) References Cited

U.S. PATENT DOCUMENTS

| | | | | |
|---|---|---|---|---|
| 4,011,732 | A * | 3/1977 | Doherty | F16L 39/005 62/50.7 |
| 4,121,858 | A * | 10/1978 | Schulz | F16L 39/005 285/123.1 |
| 4,610,700 | A * | 9/1986 | Miller | F01N 3/005 502/67 |
| 4,818,629 | A * | 4/1989 | Jenstrom | B01J 19/02 428/614 |
| 4,886,305 | A * | 12/1989 | Martin | F16L 39/005 285/123.17 |
| 5,400,828 | A | 3/1995 | Ziu et al. | |
| 6,701,967 | B2 | 3/2004 | Louis et al. | |
| 8,540,137 | B1 * | 9/2013 | Hacikyan | B23K 9/326 428/84 |
| 2003/0178842 | A1 * | 9/2003 | Gallagher | F16L 39/005 285/123.15 |
| 2005/0212285 | A1 * | 9/2005 | Haun | F16L 39/005 285/123.1 |
| 2008/0315578 | A1 | 12/2008 | Pionetti | 285/123.15 |
| 2010/0282353 | A1 * | 11/2010 | Baylot | F16L 39/005 138/155 |
| 2013/0025875 | A1 * | 1/2013 | Critsinelis | E21B 17/203 166/372 |
| 2015/0369413 | A1 * | 12/2015 | Dill | F16L 39/005 228/139 |
| 2019/0072221 | A1 | 3/2019 | Varfolomeev et al. | |

FOREIGN PATENT DOCUMENTS

| | | |
|---|---|---|
| EP | 3171065 A1 | 5/2017 |
| FR | 2804197 A1 | 7/2001 |
| WO | WO 2007/096547 A2 | 8/2007 |
| WO | WO 2017/085147 A1 | 5/2017 |
| WO | WO-2018077473 A1 * | 5/2018 ............ F16L 39/005 |

OTHER PUBLICATIONS

International Search Report mailed Jun. 13, 2022 in corresponding PCT International Application No. PCT/IB2021/000826.

Written Opinion mailed Jun. 13, 2022 in corresponding PCT International Application No. PCT/IB2021/000826.

* cited by examiner

PIPE-IN-PIPE PIPELINES

CROSS-REFERENCE TO RELATED APPLICATIONS

The present application is a 35 U.S.C. §§ 371 national stage application of International Application No. PCT/IB2021/000826 filed Nov. 30, 2021, which claims priority to United Kingdom Patent Application No. 2018785.2, filed Nov. 30, 2020, the contents of which are incorporated herein by reference.

The present invention relates to a pipe-in-pipe (PIP) pipeline assembly for the transport of a fluid in a marine environment, and a method of connecting first and second PIP pipeline lengths to form a pipe-in-pipe (PIP) pipeline for the transport of a fluid in a marine environment.

BACKGROUND TO THE INVENTION

PIP pipelines are well known in the art, and generally comprise an outer pipe and at least one, usually one, concentric or co-axial inner pipe. The inner pipe is used to transport or convey fluids such as hydrocarbons, in particular oil and gas, between two or more static and/or moveable locations, and can also be termed a flowline. This includes conveying fluids between vessels, or locations at or near a seabed such as an oil head, in particular a remote oil head, to an underwater facility and/or to a riser towards sea level, and/or directly to an onshore facility.

The outer pipe in the PIP pipeline generally provides protection, as well as an annular space between the inner and outer pipes for various reasons. These can include thermal insulation, as well as to locate a number of items or accessories having a specific function. For example, they can be: longitudinal heating cables or other cables; transverse bulkheads for transferring mechanical loads between the outer pipe and the inner pipe: buckle arrestors to prevent the provocation of radial buckles; and water stops to avoid the ingress of water into a compartment defined between two water stops.

There are two common methods of laying underwater or marine pipelines. The 'stove piping method' involves assembling pipe stalks on a marine pipe-laying vessel, and then welding each one as the laying progresses. This method avoids bending the pipe stalks, but involves extensive offshore OPEX and time.

In the 'reeled lay method', the pipeline is assembled onshore from a number of stalks or sections, spooled onto a large reel, sometimes also termed a storage reel or drum. Once offshore, the pipeline is unwound from the reel and is directly available for laying through a pipelay ramp or tower, with no stalk or section-welding being required during the offshore operation. As such, the reeled lay method is usually faster than the stove piping method, and the preferred laying procedure where possible in view of the time-critical nature of pipeline laying due to its CAPEX and OPEX.

Figure 1:
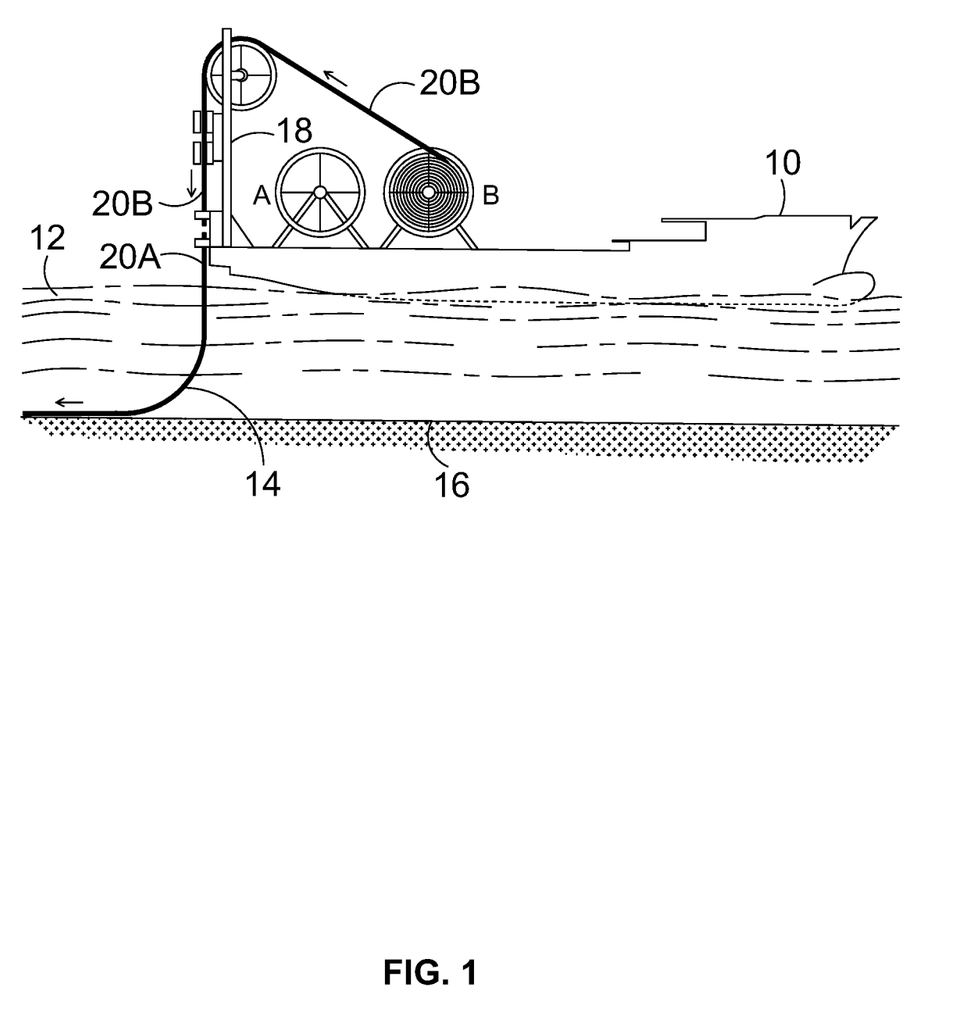
FIG. 1 is a schematic view of a pipelay vessel and pipe laying process.

For laying more than one PIP pipeline for different laying operations during one offshore trip, or to extend a PIP pipeline beyond the length available on one reel, two or more reels may be required. The accompanying FIG. 1 shows an example of a pipe-laying vessel 10 at sea 12, in the action of laying a PIP pipeline 14 on a seabed 16 using the reeled lay method, based on passing the pipeline 14 from a first reel A down through a pipelay tower 18 at the end or at the edge of the vessel 10. Where all the PIP pipeline 14 from the first reel A has been used, leaving a free pipeline end 20A in a holding clamp, it is now desired to join the free end 20B of a second PIP pipeline, reeled on a second reel B on the vessel 10, onto the pipeline end 20A.

Joining the free end 20A of the first PIP pipeline 14 from first (finished) reel A to the free end 20B of a second PIP pipeline on a second (full) reel B conventionally requires cutting the outer pipe of each free end 20A, 20B to reveal each inner pipe, connecting the inner pipes by welding, locating two 'half shell' outer pipes around the welded inner pipes to form a continuation of the outer pipes, performing a transverse weld between the ends of the half shells and the ends of the outer pipes of the pipeline lengths, and then performing two longitudinal welds between the half shells.

All these welds must be achieved offshore, i.e. in the general offshore environment, and not under any special welding conditions better suited to achieving a best quality final weld. Quality assurance testing of offshore welding is also more difficult than onshore testing under more controlled conditions. Thus, the connection created by the conventional offshore process can have quality assurance issues, and be a potentially weaker part of the laid pipeline. In addition, each weld requires time and thus increases the cost of pipe laying due to the cost of the pipelay vessel.

Even onshore, joining two PIP pipeline lengths together requires two welds, one for the inner pipes and one for the outer pipes. Such PIP pipelines are generally joined performing the following steps:
  welding the inner metal pipes of two pipe in pipe sections;
  pulling the outer pipe of one pipe in pipe section towards the outer pipe of a second pipe in pipe section;
  welding the outer pipes of two pipe in pipe sections.

But performing two welds increases the time at which the overall pipe in pipe can be delivered to the pipelay vessel.

It is an object of the present invention to provide an improved PIP joining assembly and method.

SUMMARY OF THE INVENTION

The present invention provides a pipe-in-pipe (PIP) pipeline assembly for the transport of a fluid in a marine environment comprising:
  (a) a PIP pipeline length comprising at least metal inner and outer pipes and an annular space thereinbetween, the inner metal pipe having an internal diameter;
  (b) a PIP bulkhead, having
    a first end connected to an end of the PIP pipeline length and comprising at least a metal inner pipe with a first internal diameter, an outer pipe, and an annular space thereinbetween, and
    a second end comprising an outer pipe with a second internal diameter, and being able to be joined to a second end of a second PIP bulkhead,
      wherein the second internal diameter of the second end is greater than the first internal diameter of the first end of the PIP bulkhead.

The present invention also provides a method of connecting first and second PIP pipeline lengths to form a pipe-in-pipe (PIP) pipeline for laying in a marine environment comprising:
  (a) providing the first and second PIP pipeline lengths, each comprising at least metal inner and outer pipes and an annular space thereinbetween, the inner metal pipe having an internal diameter, and each being attached to a PIP bulkhead having a first end comprising at least metal inner and outer pipes and an annular space thereinbetween and connected to an end of the PIP pipeline, and having a second end comprising an outer pipe able to be joined to a second end of a second PIP bulkhead, the internal diameter of the second end being greater than the internal diameter of the first end of the PIP bulkhead; and (b) connecting the second ends of the outer pipes of the PIP bulkheads.

The present invention also provides a pipe-in-pipe (PIP) pipeline assembly wherever formed by a method as defined herein.

The present invention also provides a pipe-in-pipe (PIP) pipeline assembly sleeve locatable within the outer pipes of second ends of two PIP bulkheads connected to two PIP pipeline lengths, and having an internal diameter being the same or similar to the internal diameter of the metal inner pipes of the PIP pipeline lengths, the sleeve having two circumferential shoulders and a recess between the shoulders, at least one shoulder being locatable within the second end of a first PIP bulkhead, and at least one shoulder being locatable within the second end of a second PIP bulkhead, such that the recess forms an annular space between the sleeve, two shoulders of the sleeve, and the second ends of the first and second PIP bulkheads.

DESCRIPTION OF THE DRAWINGS

The invention can be better understood with reference to the following detailed description together with the appended illustrative drawings in which.

DETAILED DESCRIPTION OF THE DRAWINGS

Generally, a pipe-in-pipe pipeline, commonly termed a "PIP pipeline", is formed of a number of PIP pipeline stalks or sections, commonly but not limited to, each having inner and outer metal pipeline sections of the same or similar length. The PIP sections, and hence the PIP pipeline, also comprise at least inner and outer concentric or co-axial metal pipes, having an annular space thereinbetween. The inner metal pipe may comprise an inner layer or liner to protect the inner metal pipe from corrosion. The liner is generally a metallic liner or a plastic liner. The outer metal pipe may comprise an outer coating made of a polymeric material such as a polypropylene (PP). For example, a five-layer PP (5LPP) or seven-layer PP (7LPP) coating may be used for thermal insulation.

The inner and outer pipes may also be made of composite material, or one pipe may be of steel and the other pipe may be of composites. The pipes are spaced from each other to define an insulating annulus between them. In addition to thermal insulation, the double-walled construction enhances mechanical strength and leak protection. An annulus may also be used to transport circulating fluids.

In the most PIP pipelines, air trapped inside the annulus by longitudinally-spaced bulkheads provides thermal insulation. The air in the annulus may be at atmospheric or reduced pressure. The bulkheads may have ports for pressure equalisation between successive pipe sections. Optionally, additional insulating material may be disposed in the otherwise air-filled annulus.

Optionally, one or both of the PIP pipeline lengths are reelable, i.e. able to be reeled on and off a reel, optionally using one or more reelable processes known in the art.

The nature and dimensions and other parameters of the inner and outer pipeline sections can differ, generally due to the different purposes, as is well known in the art, and which is not further described herein.

Pipeline stalks or sections can be any length, commonly but not limited to, 12 m or 24 m. Lengths of PIP pipeline formed from multiple PIP sections, can be relatively short, such as under 1 km long, or be up to several kilometres or more long. Such lengths of PIP pipelines can then be spooled onto reels in a manner known in the art for laying as a PIP pipeline. Examples of reelable PIP pipelines are described in WO 2010/010390 A1.

FIG. 1 shows a vessel 10 able to carry two reels A, B, each carrying a length of PIP pipeline capable of being reeled thereon, i.e. a reelable PIP pipeline length. In one embodiment, the joining together of the two PIP pipeline lengths would therefore provide one PIP pipeline that is 'double the length' of a single PIP pipeline during a pipe laying process. Alternatively, where the vessel 10 is intended to lay two or more different PIP pipelines in a single pipelaying trip, it is exceptional if the final lengths of the PIP pipelines match exactly the length of a PIP pipeline on one reel. Thus, there is a common requirement for joining the free end of the PIP pipeline length on the first finished reel A to the free end of the PIP pipeline length on the one full reel B as part of the pipelaying trip, i.e. offshore.

The conventional method of joining two such PIP pipeline ends is described herein above. It requires five offshore welds to be carried out to attach two half-shells. Each weld requires considerable time whilst a pipeline is on the 'critical path' for laying a pipeline, (and where time is money due to the cost of the pipelay vessel), and each of which may not be the same integrity or quality as onshore welds. The time for the welds may also lead to the held pipeline having a long Tpop, and a low alpha factor (the acceptable wave height for the execution of safe marine operations). All of these may be detrimental to the final mechanical properties of the overall pipeline, which may therefore be more likely to fail in use.

According to one embodiment of the present invention, there is provided a pipe-in-pipe (PIP) assembly for the transport of a fluid in a marine environment comprising:

(a) a PIP pipeline length comprising at least metal inner and outer pipes and an annular space thereinbetween, the inner metal pipe having an internal diameter;

(b) a PIP bulkhead, having
a first end connected to an end of the PIP pipeline length and comprising at least a metal inner pipe with a first internal diameter, an outer pipe, and an annular space thereinbetween, and
a second end comprising an outer pipe with a second internal diameter, and being able to be joined to a second end of a second PIP bulkhead, wherein the second internal diameter of the second end is greater than the first internal diameter of the first end of the PIP bulkhead.

Optionally, the internal diameter of the inner metal pipe is the same as the first internal diameter of the first PIP bulkhead, the same as the first internal diameter of the second PIP bulkhead, and preferably the same as the first internal diameters of the first and second PIP bulkheads.

According to the present invention, pipeline stalks or sections are welded together onshore to form a first PIP pipeline length. The free end the first PIP pipeline length is then welded to a PIP bulkhead forming a first PIP pipeline assembly. The first PIP pipeline assembly is then spooled onto a first reel on a pipe laying vessel.

In one embodiment of the present invention, a free end of a second length of a PIP pipeline is welded to a PIP bulkhead forming a second PIP pipeline assembly. The second PIP pipeline assembly is spooled onto a second reel on the pipe laying vessel.

In an alternative embodiment of the present invention, a free end of a (typically short) PIP pipeline length attached to a termination is welded to a PIP bulkhead to form a second PIP pipeline assembly. The second PIP pipeline assembly may be separately transported to a laying site. The termination may be a midline or terminal device or apparatus, including but not limited to, a Pipeline End Termination (PLET) or an In-Line Tee (ILT) or a Flowline End Termination (FLET).

The first PIP pipeline assembly is unreeled from the first reel and laid in seawater onto the seabed. The outer pipe of the second end of the PIP bulkhead of the first PIP pipeline assembly is welded to the outer pipe of the second end of the PIP bulkhead of the second PIP pipeline assembly. A single weld is thus performed on the pipelaying vessel.

Subsequently, the second PIP pipeline assembly is unreeled from the second reel and laid in seawater onto the seabed.

Optionally, the PIP pipeline assembly further includes:
(c) a sleeve at least partly located within the outer pipe of the second end of the PIP bulkhead, and having a sleeve internal diameter being the same or similar to the internal diameter of the metal inner pipe of the PIP pipeline length, and having two circumferential shoulders and a recess between the shoulders, at least one shoulder being within the second end of the PIP bulkhead, and at least one shoulder being beyond the end of the second end of the PIP bulkhead.

The PIP pipeline assembly allows a second PIP length to be added to the free end of the sleeve.

Thus, in another embodiment of the present invention, there is provided a pipe-in-pipe (PIP) pipeline assembly comprising:
(a) first and second PIP pipeline lengths, each comprising at least metal inner and outer pipes and an annular space therebetween, the inner metal pipe having an internal diameter;
b) first and second PIP bulkheads, each bulkhead having—a first end connected to an end of the PIP pipeline length and comprising at least a metal inner pipe with a first internal diameter, an outer pipe, and an annular space therebetween, and
a second end comprising an outer pipe with a second internal diameter, and being able to be joined to a second end of a second PIP bulkhead,
wherein the second internal diameter of the second ends is greater than the first internal diameter of the first ends of the PIP bulkheads.

Optionally, the PIP pipeline assembly further comprises:
(c) a sleeve within the outer pipes of the second ends of the PIP bulkheads, and having a sleeve internal diameter being the same or similar to the internal diameter of the metal inner pipes of the PIP pipeline lengths, and having two circumferential shoulders and a recess between the shoulders, one shoulder being within the second end of the first PIP bulkhead, and one shoulder being within the second end of the second PIP bulkhead.

Optionally, the recess of the sleeve has an outer diameter that is less than the internal diameter of the second end of the PIP bulkhead, and at least one shoulder of the sleeve has an outer diameter being the same or similar to the internal diameter of second end of the PIP bulkhead.

The internal diameter of the sleeve is preferably the same as the internal diameter of the metal inner pipes of the PIP pipeline lengths, but the invention is not limited thereto, and the internal diameter of the sleeve may have some variation in this regard, as long as the sleeve is able to be part of the flowline or flowpath of material, typically hydrocarbon material, passing along the metal inner pipes of the PIP pipeline lengths in the final PIP pipeline formed.

Optionally, the internal diameter of the sleeve is the same as the first internal diameter of the first PIP bulkhead, the same as the first internal diameter of the second PIP bulkhead, and preferably the same as the first internal diameters of the first and second PIP bulkheads.

The sleeve may have any number of shoulders, including two, three, four or more shoulders, as long as one shoulder is located so as in use to be within the second end of the PIP bulkhead, and one shoulder in use is located beyond the end of the second end of the PIP bulkhead, optionally locatable in use within the end of an opposing PIP bulkhead in a manner described hereinafter.

Optionally, the sleeve has two shoulders having an outer diameter being the same as or similar to the internal diameter of the second end of a PIP bulkheads. Such shoulders are intended to form a snug fit or interference fit with the internal diameter of a PIP bulkhead.

The shoulders of the sleeve may be formed on the sleeve, to be upstanding or outstanding compared to the general outer circumference of the sleeve, or may be formed to partly or substantially provide the outer circumference of the sleeve.

Optionally, the sleeve has two circumferential shoulders extending from each end of the sleeve, and a central recess between the shoulders. The recess may be symmetrically located, and have any relative depth able to allow an annular space in use to be created as described herein, to allow welding of the second ends to be carried out without affecting the sleeve located therebelow in use.

Optionally, the sleeve is elongate, and optionally one or both ends of the sleeve are chamfered to assist location of the sleeve into the outer pipe of a second end of a PIP bulkhead.

Optionally, each of the shoulders of the sleeve is able to form a seal with an internal diameter of an outer pipe of a second end of a PIP bulkhead. Optionally, the sleeve shoulders form seals with the internal diameters of the outer pipes of both second ends of a PIP bulkheads. As it will be described hereinbelow, seals assist forming a purging chamber.

Optionally, each sleeve shoulder includes one or more sealing rings such as O-rings. Optionally, each sleeve shoulder includes a groove or insert to house a sealing ring. Suitable sealing rings are known in the art, and include O-rings and lip-rings, and are not further discussed herein. Sealing rings assist or enhance a seal with an internal diameter of an outer pipe of a PIP bulkhead. Sealing rings may also provide anti-vibration and anti-rotation properties to the sleeve.

The or each shoulder of the sleeve may have any suitable design, including but not limited to circular around the outer circumference of the outer pipe, and forming one or more raised portions able to provide sealing with the internal diameter of the second end of a PIP bulkhead of the present invention.

Optionally, the annular space formed between the two shoulders of the sleeve, the recess between the shoulders, and the second ends of the first and second PIP bulkheads, forms a purging chamber. The purging chamber allows an inert gas such as argon to be around, in particular underneath and extending outwardly from the expected weld position between the ends of the bulkheads.

Optionally, the or each PIP bulkhead is made of any suitable metal or combination of metals. Advantageously, the PIP bulkheads are made of a low alloy steel like ASTM A694 F65 material. Preferably, the PIP bulkheads are internally cladded, for example with a nickel-based superalloy like Inconel® 625.

Optionally, the sleeve may be formed of any suitable materials or combination of materials.

Optionally, the sleeve is formed from one or more polymer materials able to withstand harsh operating conditions, for example sour environment and/or high service temperatures and pressures, and well as having chemical inertness, and chemical aging resistance.

Optionally, the sleeve is formed from one or more of PEEK, Polyetheretherketone, PTFE, Polytetrafluoridethylene, or POM, Polyoxymethylene.

Advantageously, the polymer material is a fluoropolymer resin such as a polytetrafluoroethylene (PTFE). The PTFE may comprise additional fillers such as carbon fillers to improve its moulding. PTFE has a working temperature between −200° C. and +260° C., and it is NORSOK M710 certified. Thus PTFE can be used for subsea oil and gas applications, for example for an oil conveying pipeline. PTFE ensures good mechanical, thermal and chemical resistances to the fluid conveyed inside the metal inner pipe of the PIP pipeline.

As the weight of a polymeric based sleeve is lower than the weight of a metallic based sleeve, the use of a polymer material such as PTFE also improves the sealing of a formed purging chamber, as the sealing rings are less stressed under the weight of the sleeve. In addition, a polymeric sleeve reduces the stiffness of the finally formed PIP pipeline assembly compared to using a metallic sleeve.

A PTFE sleeve also has a particularly low wear coefficient, (better than steel), and a very low friction coefficient (i.e. good tribological properties, which are advantageous for a subsequent wax pigging operation to pass through a reel to reel joint a number of times, even up to 1000 times).

As such, a PTFE sleeve exhibits excellent chemical stability, good thermal conductivity, improved workability, exceptional temperature resistance, improved compression strength, improved creep resistance, improved thermal dimensional stability, and is suitable for use in oil and gas pipelines.

Alternatively, the sleeve is formed from a cladding material, optionally from stainless steel, and preferably such as stainless steel 316L. Optionally, the sleeve is wholly or substantially formed from the same material as the metal inner pipes of the PIP pipeline lengths it is conjoining, so as to provide a continuation of such material from one PIP pipeline length to the other PIP pipeline length Optionally, the recess of the sleeve includes a heat resistant barrier. Preferably, a heat resistant tape is wrapped around the central recess of the sleeve. Advantageously, at least three layers of heat resistant tape are wrapped around the sleeve to protect it from heat radiation or heat emission exhibited during the welding operation of the second ends of the first and second PIP bulkheads.

Optionally, the sleeve includes a series of purging holes between its inner surface and its outer surface.

Optionally, the purging holes emerge on the outer surface of the sleeve at or near a shoulder defining the recess between the shoulders.

Purging holes allow an inert gas injected into the inside of the sleeve to reach the purging chamber. At least one line, preferably two lines, of a plurality of purging holes are machined along the circumference of the inner sleeve internal diameter. The purging holes are through holes. Advantageously, the purging holes pass through the circumferential shoulders of the sleeve, close to the sealing rings.

Optionally, a purging dam is located in the sleeve prior to the welding of second ends of the PIP bulkheads. A purging dam can increase the volume of the purging chamber so as to introduce more inert gas into a purging chamber and thus enhance the efficiency of the welding.

Optionally, the purging dam is removable either physically, chemically or both. For example, the purging dam could be wholly or partly formed from a biodegradable or soluble material such as paper. Soluble purging dams are known in the art, and can be a pre-formed self-adhesive water soluble purge dam (available from Aquasol Corporation, USA). A soluble purging dam can be removed or flushed away after the welding operation leaving no remainder or residue in the PIP pipeline.

The purging dam can be located in the sleeve either onshore or offshore.

Optionally, an inert gas inlet pipe is located between the second ends of the PIP bulkheads when located together, which pipe reaches a purging dam. In this way, inert gas such as argon can be pumped into the purging dam, and then out through the purging holes and into the annular space formed between the two circumferential shoulders, the recess between the shoulders and the second ends of the first and second PIP bulkheads forms a purging chamber. This purges the air from the annular space prior to welding the second ends together.

Optionally, the sleeve is a pigging sleeve. A pigging sleeve is able to allow the passage of a pig therethrough. Pigging is the practice of using pipeline pigs or scrapers, to perform various maintenance operations, typically without stopping the flow of the product in the pipeline. These operations include but are not limited to cleaning and inspecting the pipeline.

As such, the present invention also extends to a PIP reel to reel assembly having a piggable joint, for service pigs, de-waxing pigs, and the like. A pipe-in-pipe PIP pipeline Assembly with a piggable PIP joint also facilitates welding offshore (for example argon purging), and maintains a constant flowline internal diameter to allow unhindered pigging.

In the present invention, the length of the sleeve may be the same as or less than twice the length of the second end of the PIP bulkhead. In this way, the PIP bulkhead length could be machinable to reduce its overall length offshore. In this way, the PIP pipeline manufacturer is not limited to providing and conjoining PIP bulkheads to match the sleeve length: the sleeve length can be adapted to match in practice the lengths of the second ends of the PIP bulkheads once known during their conjoining process.

Alternatively or additionally, the length of the sleeve can be reduced to suit the space provided between two PIP bulkheads.

In the present invention, the PIP bulkhead optionally has a transverse internal wall between its first and second ends, and an end of the sleeve is able to abut the transverse wall.

In the present invention, the sleeve is intended to be inserted into the end of the PIP pipeline length when required. In this way, the present invention can provide abutting first and second reelable PIP bulkheads at the ends of first and second PIP pipeline lengths, ready for conjoining.

Thus, according to one embodiment of the present invention, there is provided a pipe-in-pipe (PIP) pipeline assembly as defined herein comprising:
(a) first and second PIP pipeline lengths, each comprising at least metal inner and outer pipes and an annular space thereinbetween, the inner metal pipe having an internal diameter;
(b) first and second PIP bulkheads, each PIP bulkhead having a first end connected to an end of the PIP pipeline length and comprising at least a metal inner pipe with a first internal diameter, an outer pipe, and an annular space thereinbetween, and a second end comprising an outer pipe with a second internal diameter, and being able to be joined to a second end of a second PIP bulkhead,
wherein the second internal diameters of the second ends are greater than the first internal diameters of the first ends of the PIP bulkheads.

Optionally, the first and second PIP pipeline lengths are reelable pipelines, and the first reelable PIP pipeline length is provided from a first reel, and the second reelable PIP pipeline length is provided from a second reel. Optionally, the first and second PIP pipeline lengths are reelable pipelines and the sleeve is a pigging sleeve able to provide a constant internal diameter, or bore, across the joint of the PIP pipelines.

Alternatively, one PIP pipeline length is connected to a termination.

Optionally, the pipe-in-pipe (PIP) pipeline assembly further comprises:
(c) a sleeve at least partly located within the outer pipe of the second end of the PIP bulkhead, and having a sleeve internal diameter being the same or similar to the internal diameter of the metal inner pipe of the PIP pipeline length, and having two circumferential shoulders and a recess between the shoulders, at least one shoulder being within the second end of the PIP bulkhead, and at least one shoulder being beyond the end of the second end of the PIP bulkhead.

The present invention also provides a method of connecting first and second PIP pipeline lengths to form a pipe-in-pipe (PIP) pipeline for laying in a marine environment comprising:
(a) providing the first and second PIP pipeline lengths, each comprising at least metal inner and outer pipes and an annular space thereinbetween, the inner metal pipe having an internal diameter, and each being attached to a PIP bulkhead having a first end comprising at least metal inner and outer pipes and an annular space thereinbetween and connected to an end of the PIP pipeline, and having a second end comprising an outer pipe able to be joined to a second end of a second PIP bulkhead, the internal diameter of the second end being greater than the internal diameter of the first end of the PIP bulkhead; and
(b) Connecting the second ends of the outer pipes of the PIP bulkheads The method may further comprise the step of:
locating a sleeve as defined herein in the outer pipes of the second ends of the PIP bulkheads prior to step (b), such that one sleeve shoulder is within the second end of the first PIP bulkhead, and at least one sleeve shoulder is within the end of the second end of the second PIP bulkhead to form an annular space between the sleeve, two shoulders of the sleeve, and the second ends of the first and second PIP bulkheads.

Optionally, the method further comprises the step of purging the annular space between the two shoulders of the sleeve, the recess between the shoulders, and the second ends of the first and second PIP bulkheads prior to connecting the second ends of the outer pipes of the PIP bulkheads.

In one embodiment of the present invention, the method comprises the steps of:
locating a purging dam in the sleeve;
forming a passageway for a purging gas between the second ends of the first and second PIP bulkheads into the purging dam; and
passing a purging gas through the passageway into the purging dam, through purging holes in the sleeve, and into the recess between the shoulders of the sleeve either prior to, or during, or both, step (b) of connecting the second ends of the outer pipes of the PIP bulkheads together.

Where the sleeve is a pigging sleeve, the present invention extends to a method of method of forming a pipe-in-pipe (PIP) pipeline assembly with a pigging joint.

The present invention also provides a pipe-in-pipe (PIP) pipeline assembly wherever formed by a method as defined herein.

Optionally, the present invention is provided on a pipe-laying vessel. Such vessels are known in the art, and generally comprise a pipelay ramp or tower. The accompanying FIG. 1 shows an example of a pipe-laying vessel 10 at sea 12, in the action of laying a PIP pipeline 14 on a seabed 16 using the reeled lay method, based on passing the pipeline 14 from a first reel A down through a pipelay tower 18 at the end or at the edge of the vessel 10. Where all the PIP pipeline 14 from the first reel A has been used, leaving a free pipeline end 20A, it is now desired to join the free end 20B of a second PIP pipeline reeled on a second reel B on the vessel 10, to the free end 20A.

Figure 2:
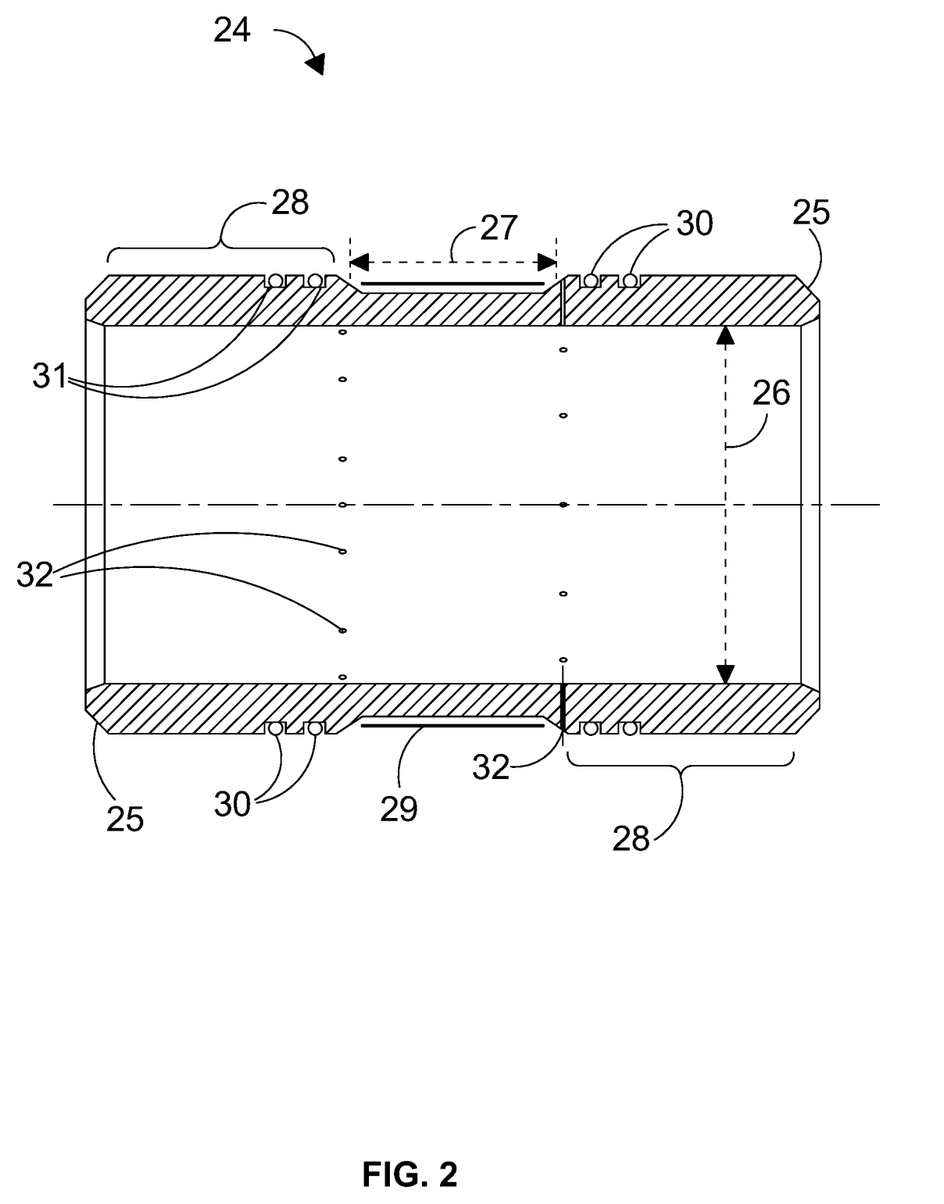
FIGS. 2 and 2a are across-sectional view and a perspective view respectively of a sleeve according to one embodiment of the present invention.
Figure 2A:
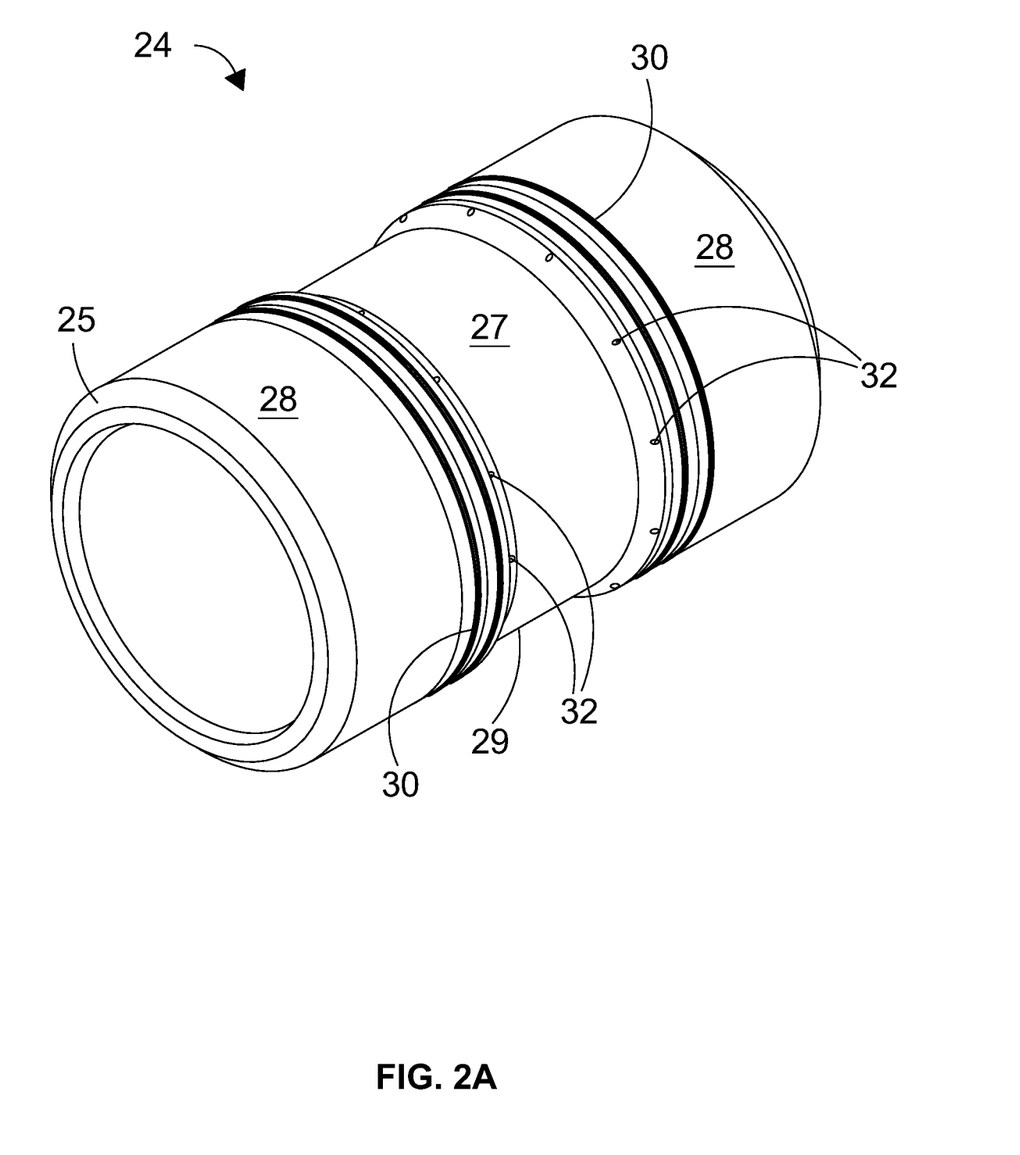

FIGS. 2 and 2a show an example of a sleeve 24 as an embodiment of the present invention, and for use in another embodiments of the present invention, as part of a PIP pipeline assembly, and for conjoining two PIP pipeline lengths. The sleeve 24 has a generally cylindrical internal diameter 26, preferably a smooth internal diameter. The sleeve internal diameter 26 is the same as the internal diameter of the metal inner pipes of suitable PIP pipeline lengths discussed hereinafter.

The sleeve 24 has two circumferential shoulders 28 arranged along the length of the outer surface of the sleeve 24 from each end towards the middle of the sleeve. The ends of the shoulders 28 are chamfered 25.

Between the shoulders 28 is a circumferential recess 27. The recess may be formed by machining between the shoulders 28, and may have any suitable depth relative to the shoulders. Optionally, there is a general sloping between the shoulders 28 and the recess 27.

Within the recess 27 and around the recess circumference is a heat resistant barrier in the form of a heat resistance tape 29. Advantageously, at least three layers of a heat resistant tape 29 are wrapped around the recess 27 to protect it from heat radiation or heat emission exhibited during the subsequent welding operation of the second ends of the first and second PIP bulkheads. The tape may be a silicone coated glass fibre tape like a Pyrotape®. Such type of tape provides continuous protection up to 250° C. during welding operation and up to 1650° C. during very brief instant in case of metal splash occurrence.

Each shoulder 28 has two sealing rings such as O-rings 30. Optionally, the sleeve shoulders 28 include a set of two grooves or inserts 31 to house the sealing rings 30.

Optionally, the sealing rings 30 are made of hydrogenated nitrile butadiene rubber (HNBR) having a Shore A hardness of 70. Alternatively, the sealing rings 30 are formed of spring-energised seals with a coated corrosion-resistant metal spring energiser.

Each edge of the shoulders 28 sloping to the recess 27 also has a number of purging holes 32 to allow an inert gas injected into the inside of the sleeve 24 to reach a purging chamber as discussed below. At least one line, preferably two lines, of purging holes 32 are machined around the circumference of the sleeve 24. The purging holes 32 are through holes.

Figure 3:
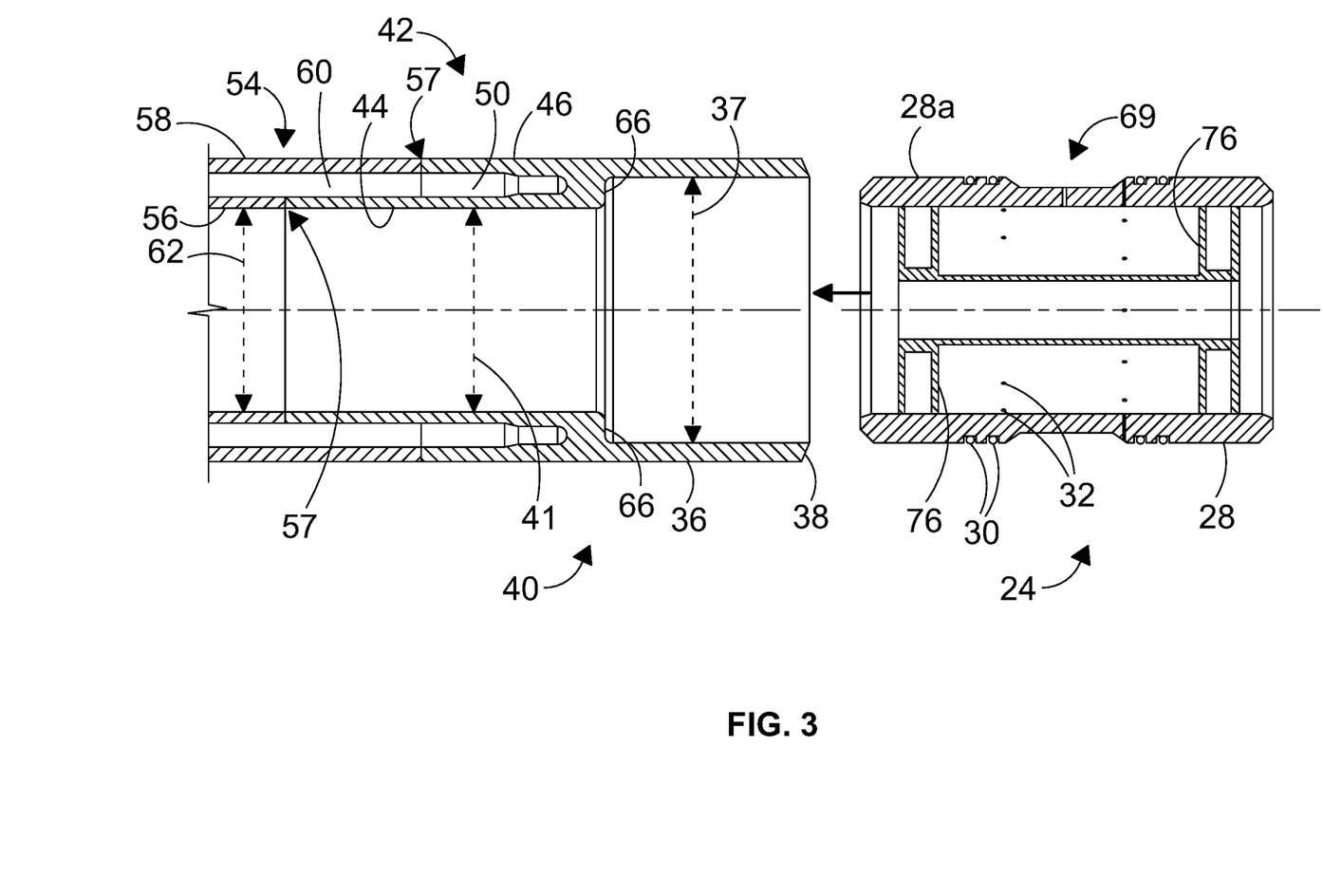
FIG. 3 is a cross-sectional view of the sleeve of FIG. 2 and a pipe-in-pipe (PIP) pipeline assembly according to a second embodiment of the present invention.

FIG. 3 shows the sleeve 24 being located within an outer pipe 36 of a second end 38 of a PIP bulkhead 40. The PIP bulkhead 40 has a first end 42 comprising at least a metal inner pipe 44 with a first internal diameter 41, a metal outer pipe 46 and an annular space 50 therebetween. The outer pipe 36 of the second end 38 has a second internal diameter 37, such that the second internal diameter 37 of the second end 38 is greater than the first internal diameter 41 of the first end 42 of the PIP bulkhead 40.

The first end 42 of the PIP bulkhead 40 is connected to an end of a PIP pipeline 54. The PIP pipeline 54 has a metal inner pipe 56 and a metal outer pipe 58 with an annular space 60 therebetween. The inner metal pipe 56 has an internal diameter 62. Preferably, the internal diameter 62 of the PIP pipeline 54 is the same as the first internal diameter 41 of the metal inner pipe 44 of the first end 42 of the PIP bulkhead 40.

The present invention is not limited by the nature, size or design of the PIP pipeline 54. The present invention is able to work with all common PIP pipelines and PIP pipeline sizes usually used for oil and gas transportation.

The annular space 60 may be evacuated so as to be free of gas or filled with a thermal insulation material such as an aerogel.

FIG. 3 shows the metal outer pipe 46 of the first end 42 of the PIP bulkhead 40 connected to the outer pipe 58 of the PIP pipeline 54 at a different longitudinal position to the connection of the metal inner pipe 44 of the first end 42 of the PIP bulkhead 40 being connected to the metal inner pipe 56 of the PIP pipeline 54. These pipe-to-pipe connections can be provided by conventional transverse welds 57, and can be carried out onshore during manufacture of the PIP pipeline 54 under a controlled onshore environment, using conventional processes and tooling. Thus, the quality of the joining of the PIP bulkhead 40 to the PIP pipeline length 54 can undergo onshore quality testing and quality assurance to the highest level in a manner known in the art.

The skilled reader can see that the combination of the PIP bulkhead 40 and the end of the PIP pipeline length 54 can form the end 20B of a reeled PIP pipeline on reel B in FIG. 1.

FIG. 3 shows the sleeve 24 being located within the bore of the outer pipe 36 of the second end 38 of the PIP bulkhead 40, so as the end of the sleeve 24 can reach and abut an internal transverse wall 66 between the first and second ends 42, 38 of the PIP bulkhead 40. In this action, a first shoulder 28a of the sleeve 24 enters the bore of the second end 38 of the PIP bulkhead. This action provides a PIP pipeline assembly according to one embodiment of the present invention. The sleeve 24 can be de-ovalised if required before being located within the bore of the outer pipe 36, which is typically machined to more or less perfectly circular.

The action of locating the sleeve 24 within the outer pipe 36 of the second end 38 of the PIP bulkhead 40 can be achieved using conventional mechanical practice which is achievable offshore, such as on the vessel 10 in FIG. 1.

Figure 4:
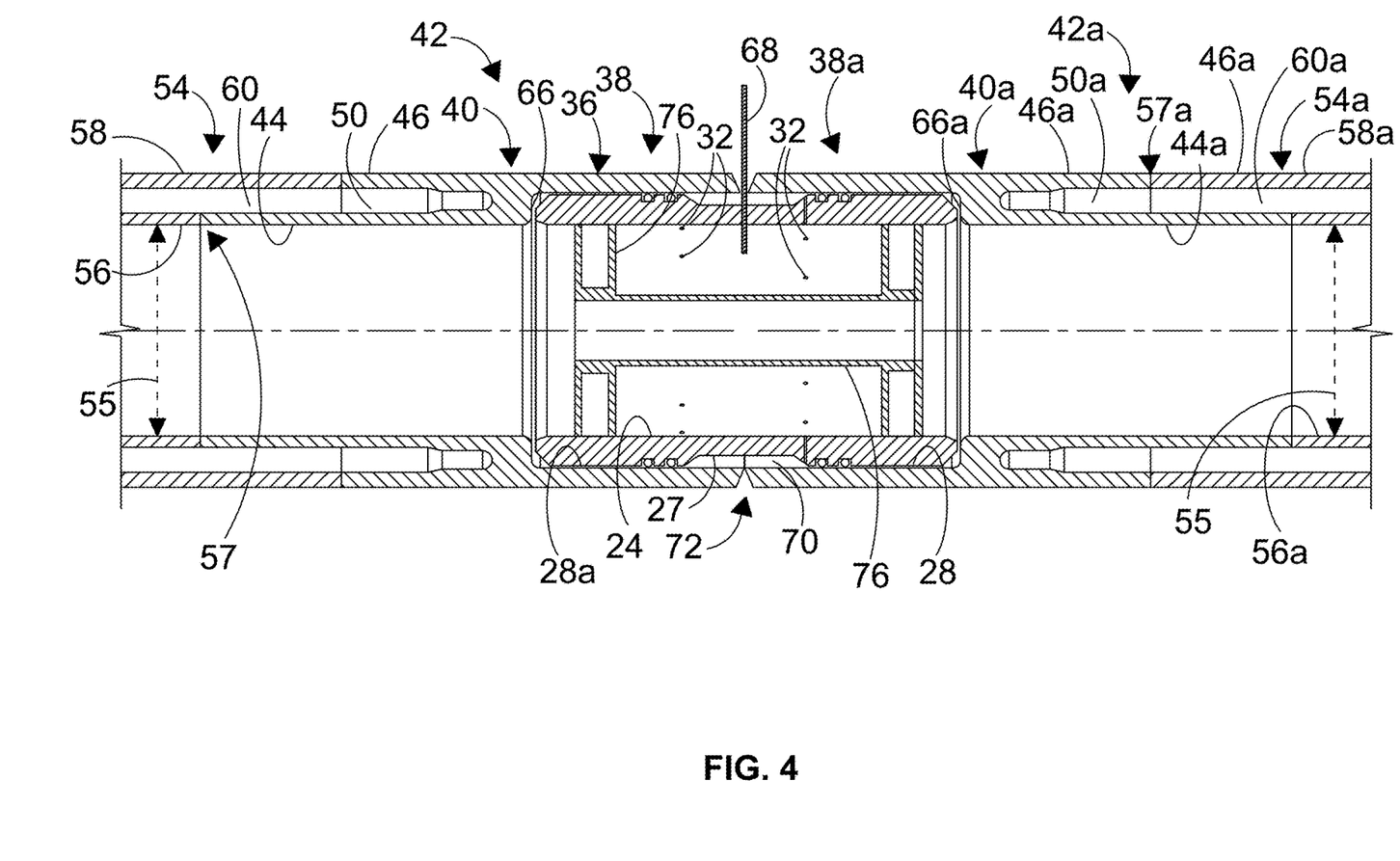
FIG. 4 is a cross-sectional view of an initial PIP pipeline assembly of FIG. 3 with the end of the second PIP pipeline length according to a third embodiment of the present invention.

FIG. 4 shows the addition of a combination of a second reelable PIP pipeline length 54a and second PIP bulkhead 40a on the other end of the sleeve 24, to provide an initial pipe-in-pipe (PIP) pipeline assembly comprising:

(a) first and second reelable PIP pipeline lengths 54, 54a, each comprising at least metal inner and outer pipes 56, 56a, 58, 58a and an annular space thereinbetween 60, 60a, the inner metal pipe having an internal diameter;

b) first and second PIP bulkheads 40, 40a, each bulkhead having a first end 42, 42a welded 57 to an end of the PIP pipeline lengths 54, 54a, and comprising at least metal inner and outer pipes 44, 46, 44a, 46a and an annular space thereinbetween 50, 50a, and having a second end 38, 38a comprising an outer pipe 36, 36a connected to each other; and (c) a sleeve 24 located within the outer pipes 36, 36a of the second ends of the PIP bulkheads 40, 40a, the sleeve internal diameter being the same as the internal diameter of the metal inner pipes 56, 56a of the PIP pipeline lengths 54, 54a, and the same as the internal diameters of the metal inner pipes 44, 44a of the PIP bulkheads 40, 40a, and having two circumferential shoulders 28a, 28b along the length of the sleeve 24, with a recess 27 thereinbetween, and with one shoulder 28a being within the second end 38 of the first PIP bulkhead 40, and one shoulder 28 being beyond the second end 38 of the first PIP bulkhead 40 and within the second end 38a of the second PIP bulkhead 40a.

The skilled reader can see that the second reelable PIP pipeline length 54a and second PIP bulkhead 40a can be the free end 20A of an existing PIP pipeline 14 shown in FIG. 1, and that the passage or location of the second reelable PIP pipeline length 54a around the resulting free end of the sleeve 24 from the process in FIG. 3 is achievable using mechanical practice to align the sleeve 24 and the PIP bulkhead second ends 38, 38a together.

FIG. 4 shows a continuation of the internal diameter 55 of the inner metal pipes 56, 56a of the first and second pipeline lengths 54, 54a through the internal diameter 26 of the sleeve 24, so as to form a continuation of the flow, flowpath or flowline of the combination thereof.

Preferably, the internal diameter 26 of the sleeve 24 is the same as or very similar to the internal diameter 62 of the PIP pipeline 54 and the first internal diameter 41 of the metal inner pipe 44 of the first end 42 of the PIP bulkhead 40, so as to form a smooth, or relatively smooth continuum of the bore of the PIP pipeline assembly.

Where the sleeve 24 is a pigging sleeve, FIG. 4 shows an initial PIP reel to reel assembly with a piggable joint for service pigs, de-waxing pigs, and the like. A sleeve made of PTFE improves piggability of the joint, as PTFE has a very low friction coefficient.

FIG. 4 also shows the abutment of both ends of the sleeve 24 against internal transverse surfaces 66, 66a of each of the first and second PIP bulkheads 40, 40a. Optionally, the sleeve 24 has a length that is the same as the length of the second ends 38, 38a of the PIP bulkheads 40, 40a, or the PIP bulkheads 40, 40a lengths and/or the sleeve 24 length are machinable to be reduced once the required sleeve length is known. In this way, the PIP pipeline manufacturer is not limited to providing a sleeve and/or PIP bulkheads to exactly match the PIP bulkhead and/or sleeve length, whose lengths may only be known or gaugeable or known offshore during their assembly and conjoining process.

FIG. 4 shows the sleeve 24 having a first shoulder 28a having an outer diameter being the same as or similar to the internal diameter 37 of the second end 38 of the first PIP bulkhead 40, and a second shoulder 28 having an outer diameter being the same as or similar to the internal diameter of the second end 38a of the second PIP bulkhead 40a.

The length, location or position of the first and second shoulders 28, 28a is not limiting within each of the second ends 38, 38a of the first and second PIP bulkheads 40, 40a, and the skilled reader can see that shorter or multiple shoulders can be provided around the sleeve 24 if desired, especially if desired to change the fit or mating of the shoulders 28 with the internal diameter of the second ends 38, 38a of the first and second PIP bulkheads 40, 40a.

FIG. 4 shows the forming of a purging chamber 70 created by and between the first and second shoulders 28, 28a, the recess 27 between the first and second shoulders 28, 28a, and the inner surfaces of the second ends 38, 38a of the PIP bulkheads 40, between the first and second shoulders 28, 28a.

FIGS. 3 and 4 also show a purging dam 76 located in the sleeve 24 either onshore or offshore before the step shown in FIG. 3. Advantageously, the purging dam 76 is located in the sleeve 24 offshore, and preferably just prior to the positioning of the second end 36a of the second PIP bulkhead 40a over the sleeve 24. The purging dam 76 increases the volume of the purging chamber 70 so as to introduce more inert gas into the purging chamber 70 and thus enhance the efficiency of the welding.

Figure 4A:
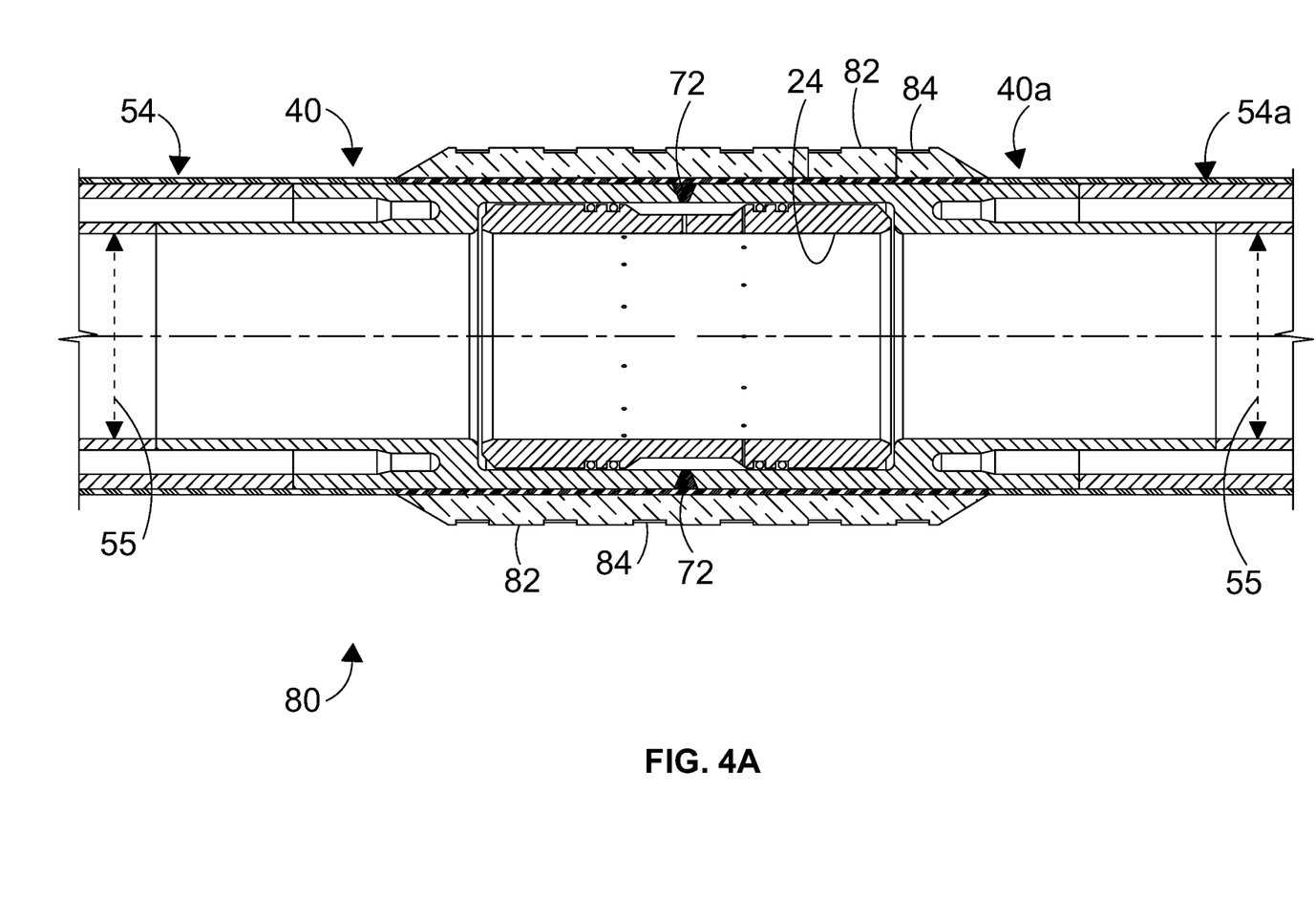
FIG. 4a is a cross-sectional view of a final conjoined PIP pipeline assembly of FIG. 3.

Optionally, the purging dam 76 is a soluble purging dam. In this way, the purging dam 76 can be removed or flushed away after the welding operation without leaving any residue behind, as shown in FIG. 4a.

In particular, FIG. 4 shows the additional step of purging the purging chamber 70 prior to connecting the second ends 38, 38a of the outer pipes 36, 36a of the PIP bulkheads 40, 40a.

To provide purging, FIG. 4 shows an inert gas inlet pipe 68 temporarily inserted (for example by drilling a suitable aperture) between the second ends 38, 38a of the PIP bulkheads 40, 40a when located together. The inlet pipe 68 passes through a aperture 69 formed through the sleeve 24 in the recess 27, so that the inlet pipe 68 reaches the inside the internal volume created between the ends of the purging dam 76 and the sleeve 24, which is also accessible to the purging holes 32.

In this way, inert gas such as argon can be pumped through the inlet pipe 68, into the inner volume created by the purging dam 76, and then out through the purging holes 32 into the purging chamber 70 formed between the two circumferential shoulders 28, 28a, the recess 27, and the second ends 38, 38a of the first and second PIP bulkheads 40, 40a.

The purging chamber 70 allows a user to purge the atmosphere within the purging chamber 70, prior to providing a transverse welding 72 to join the ends of the second ends 38, 38a of the PIP bulkheads 40, 40a so as to conjoin the first and second PIP pipeline lengths 54, 54a to form an initial combined PIP pipeline assembly.

FIG. 4a shows a final form of a combined PIP pipeline assembly 80 in which the purging dam 76 has been removed, such as by biodegrading. Following the connection of the first and second PIP pipeline lengths 54, 54a to form a pipe-in-pipe (PIP) pipeline assembly, and prior to laying said PIP pipeline assembly in a marine environment, a protective element can also be placed around the ends of the second ends 38, 38a of the PIP bulkheads 40, 40a and the transverse weld 72, to provide corrosion protection, mechanical protection, and abrasive protection to the area. The protective element may be in the form of an outer shell 82, provided in the form of two fitted half shells, held tight against the PIP bulkheads 40, 40a by a series of known transverse Inconel metallic tightening bonds or straps 84 therearound.

Advantageously, the half shells are made of a polyolefin backing for improved mechanical protection, preferably a High Density polyolefin (HDPE). In addition, the backing surface of the half shells comprises a heat-activated sleeve made of either a thermoplastic hybrid or a high shear mastic adhesive to avoid abrasion, to make the half shells installation easier, and to provide a high corrosion protection to the joint area. For example, the half shells are KLON or KLNN product commercialised by Canusa-CPS.

The final assembly 80 provides a continuum of the bore 55 of the PIP pipeline lengths 54, 54a, with only one weld required to be carried out offshore or at sea.

In this way, FIGS. 4 and 4a show a method of connecting first and second PIP pipeline lengths 54, 54a to form a pipe-in-pipe (PIP) pipeline assembly for laying in a marine environment comprising;

(a) providing the first and second PIP pipeline lengths 54,54a, each comprising at least metal inner and outer pipes and an annular space therein between, the inner metal pipe having an internal diameter, each being attached to a PIP bulkhead 40, 40a having a first end comprising at least metal inner and outer pipes and an annular space therein between and connected to an end of the PIP pipeline, and having a second end 38, 38a comprising an outer pipe 36, 36a; and (b) locating a sleeve 24 in the outer pipes 36, 36a of the second ends 38, 38a of the PIP bulkheads 40, 40a, such that one sleeve shoulder 28 is within the second end of the first PIP bulkhead, and at least one sleeve shoulder 28a is within the end of the second end of the second PIP bulkhead, to form an annular space between the sleeve, two shoulders of the sleeve, and the second ends of the first and second PIP bulkheads;

(c) connecting the second ends of the outer pipes of the PIP bulkheads.

Where the first and second PIP pipeline lengths 54, 54a are the free ends 20A, 20B shown in FIG. 1, FIG. 4 shows a method of connecting first and second PIP pipeline lengths wherein the first and second PIP pipelines lengths are reelable PIP pipeline lengths, and the free end of the first reelable PIP pipeline length is provided from the end of a first reel, and the free end of the second reelable PIP pipeline length is provided from the beginning of a second reel.

Figure 5:
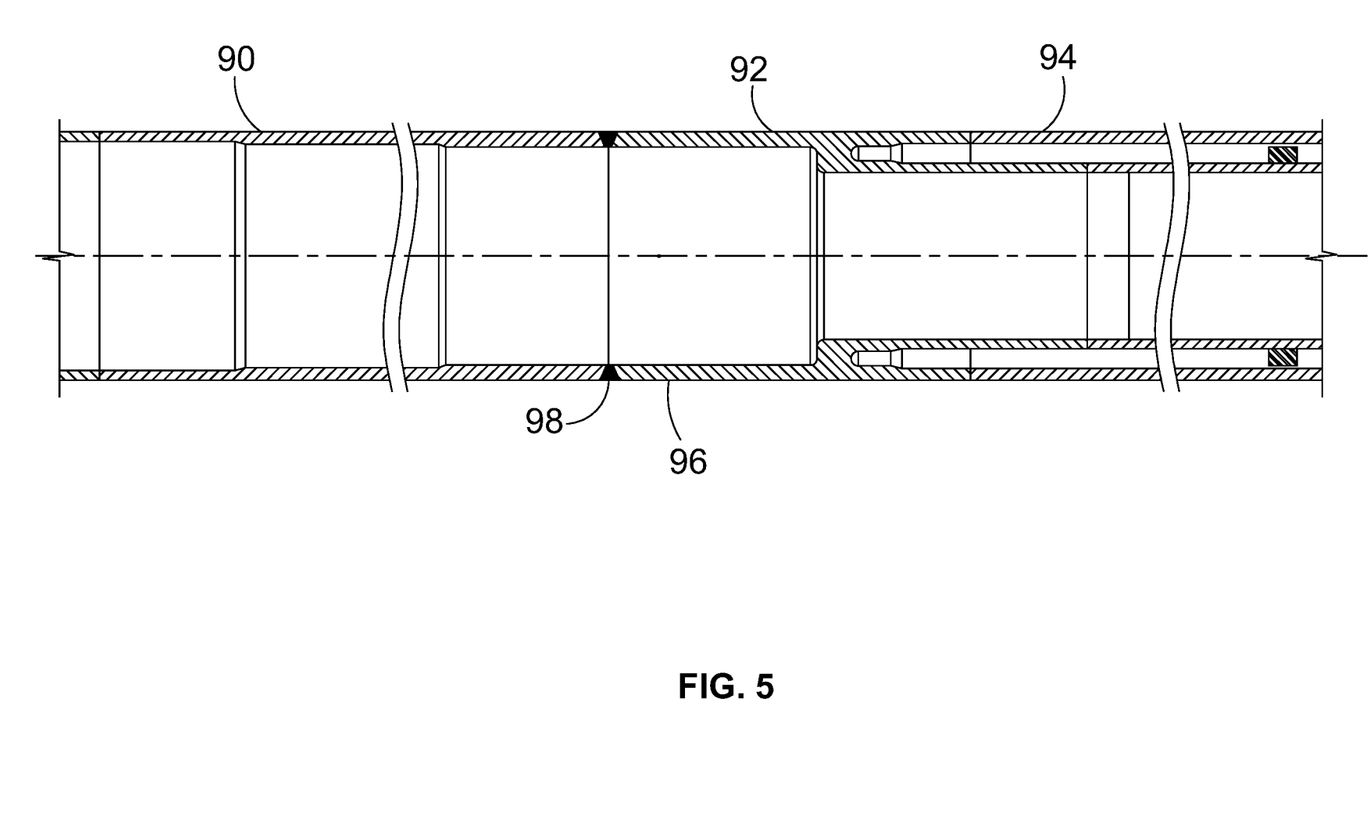
FIG. 5 is a cross-sectional view of the end of a PIP pipeline length for use in a PIP pipeline assembly according to another embodiment of the present invention.

FIG. 5 shows an alternative embodiment, wherein a transition or tailing piece 90 is conjoined to a PIP bulkhead 92, itself conjoined to the end of a PIP pipeline length 94. The PIP bulkhead 92 and the PIP pipeline length 94 may be as described herein, especially in relation to FIGS. 3 and 4. The second end 96 of the PIP bulkhead 92 is conjoined to the tailing piece 90 using a conventional girth weld 98. The tailing piece 90 provides a single internal diameter pipeline, which is conventional in the art of providing a tailing piece usable during reeling of a PIP pipeline length 94 in a manner known in the art. In use, the tailing piece 90 is easily removable by removing the weld 98, to leave the PIP bulkhead 92 ready for use in the present invention.

Figure 6:
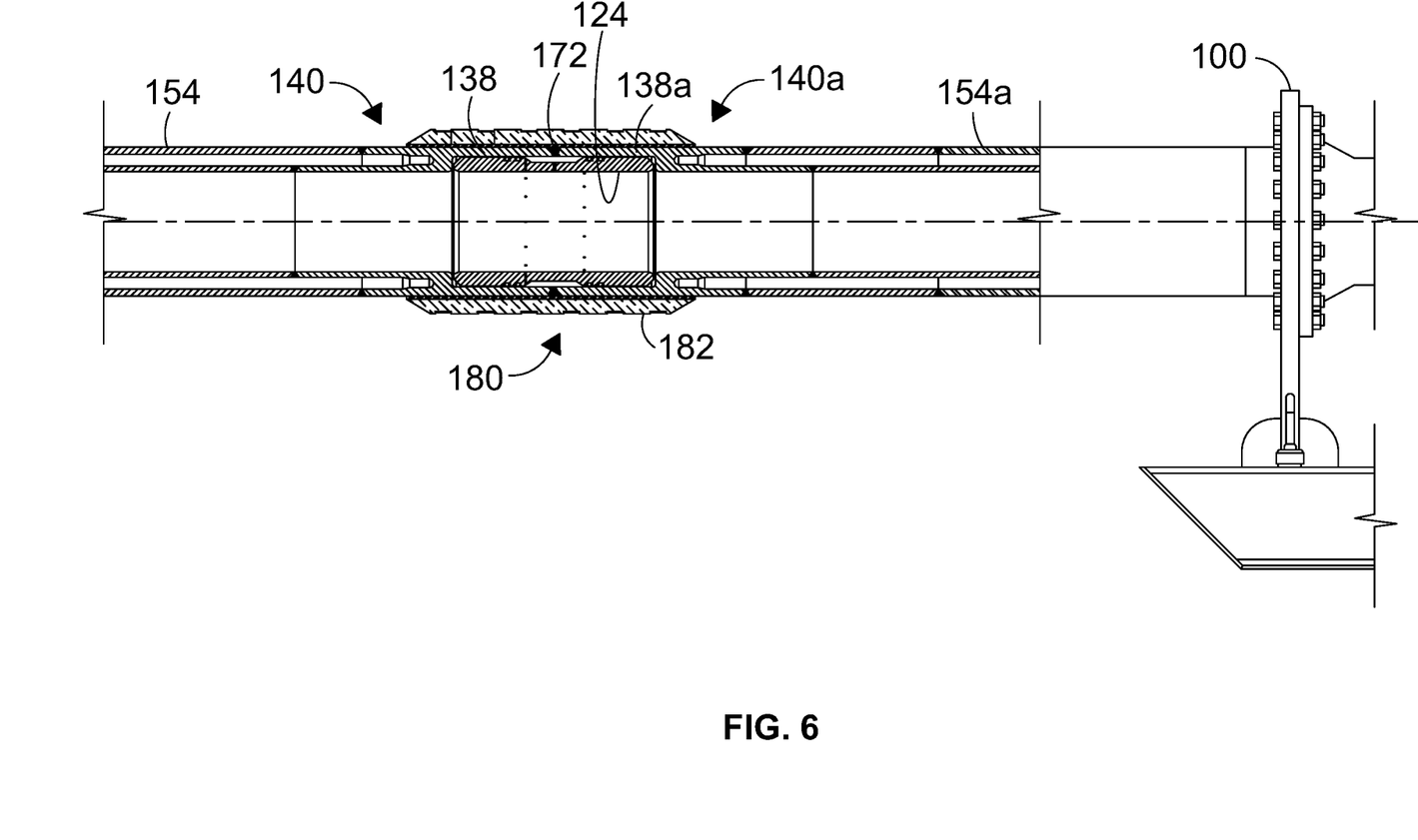
FIG. 6 is a cross-sectional view of a PIP pipeline assembly with a PLET end according to a fourth embodiment of the present invention.

FIG. 6 shows a further alternative embodiment, wherein the ends of the second ends 138, 138a of two PIP bulkheads 140, 140a are welded 172 in a similar manner as described above to securely join the first and second PIP pipeline lengths 154, 154a using a sleeve 124 and outer shell 182, to form a final combined PIP pipeline assembly 180, and wherein the second PIP pipeline length 154a is joined to a termination 100, such as a PLET. The assembly of the PLET 100, second PIP pipeline length 154a and second PIP bulkhead 140a can be carried out onshore, and the complete assembly transported to a laying position or site in a manner known in the art, ready for combining with the end of the first PIP pipeline length 154 with only one offshore weld required in a manner as described herein.

The skilled reader can see that the pipeline joining described above can equally be used onshore, for example during onshore manufacturing of a PIP pipeline.

The present invention provides a method of connecting first and second PIP pipeline lengths onshore or offshore to form a longer PIP pipeline or PIP termination connection for laying in a marine environment, which only requires one welding process, which can be carried out in a purged atmosphere underneath the weld as it is being formed, i.e., with a controlled environment which improves the welding process, leading to an improved final weld, and improved assurance of the welding quality and integrity prior to laying the pipeline in the marine environment.

The invention claimed is:

1. A pipe-in-pipe (PIP) pipeline assembly for the transport of a fluid in a marine environment comprising:
   (a) a PIP pipeline length comprising at least metal inner and outer pipes and an annular space therebetween, the inner metal pipe having an internal diameter;
   (b) a PIP bulkhead, having
   a first end connected to an end of the PIP pipeline length and comprising at least a metal inner pipe with a first internal diameter, an outer pipe, and an annular space therebetween, and
   a second end comprising an outer pipe with a second internal diameter, and being able to be joined to a second end of a second PIP bulkhead,
   wherein the second internal diameter of the second end is greater than the first internal diameter of the first end of the PIP bulkhead; and
   (c) a sleeve at least partly located within the outer pipe of the second end of the PIP bulkhead, and having a sleeve internal diameter being the same or similar to the internal diameter of the metal inner pipe of the PIP pipeline length, and having two circumferential shoulders and a recess between the shoulders, at least one shoulder being within the second end of the PIP bulkhead, and at least one shoulder being beyond the end of the second end of the PIP bulkhead.

2. A pipe-in-pipe (PIP) pipeline assembly as claimed in claim 1 wherein the recess of the sleeve has an outer diameter being less than the internal diameter of the second end of the PIP bulkhead, and at least one shoulder has an outer diameter being the same or similar to the internal diameter of second end of the PIP bulkhead.

3. A pipe-in-pipe (PIP) pipeline assembly as claimed in claim 2 having two shoulders having an outer diameter being the same or similar to the internal diameter of second end of the PIP bulkhead.

4. A pipe-in-pipe (PIP) pipeline assembly as claimed in claim 1 wherein a length of the sleeve is the same as or less than twice a length of the second end of the PIP bulkhead.

5. A pipe-in-pipe (PIP) pipeline assembly as claimed in claim 1 wherein the sleeve is formed from a polymer material.

6. A pipe-in-pipe (PIP) pipeline assembly as claimed in claim 5 wherein the sleeve is formed from a fluoropolymer resin.

7. A pipe-in-pipe (PIP) pipeline assembly as claimed in claim 5 wherein the sleeve is formed from a polytetrafluoroethylene (PTFE).

8. A pipe-in-pipe (PIP) pipeline assembly as claimed in claim 1 wherein the sleeve includes a series of purging holes.

9. A pipe-in-pipe (PIP) pipeline assembly as claimed in claim 1 wherein the recess of the sleeve includes a heat-resistant barrier layer.

10. A pipe-in-pipe (PIP) pipeline assembly as claimed in claim 1 wherein the PIP bulkhead has a transverse internal wall between the first and second ends, and an end of the sleeve is able to abut the transverse wall.

11. A pipe-in-pipe (PIP) pipeline assembly as claimed in claim 1 wherein at least one of the shoulders of the sleeve is able to form a seal with an internal diameter of an outer pipe of a second end of a PIP bulkhead.

12. A pipe-in-pipe (PIP) pipeline assembly as claimed in claim 11 wherein the sleeve shoulders include one or more sealing rings.

13. A pipe-in-pipe (PIP) pipeline assembly as claimed in claim 11 wherein the sleeve shoulders include one or more O-rings.

14. A pipe-in-pipe (PIP) pipeline assembly as claimed in claim 1 wherein the sleeve includes a purging dam.

15. A pipe-in-pipe (PIP) pipeline assembly as claimed in claim 14 wherein the purging dam is dissolvable or biodegradable.

16. A pipe-in-pipe (PIP) pipeline assembly as claimed in claim 1 wherein an annular space formed between the two circumferential shoulders of the sleeve, the recess between the shoulders, and the second ends of the first and second PIP bulkheads, forms a purging chamber.

17. A pipe-in-pipe (PIP) pipeline assembly comprising:
   (a) a first PIP pipeline length comprising at least a metal inner pipe, an outer pipe, and an annular space therebetween, the inner metal pipe of the first PIP pipeline length having an internal diameter;
   (b) a first PIP bulkhead, having
   a first end connected to an end of the first PIP pipeline length and comprising at least a metal inner pipe with a first internal diameter, an outer pipe, and an annular space therebetween, and
   a second end comprising an outer pipe with a second internal diameter,
   wherein the second internal diameter of the second end of the first PIP bulkhead is greater than the first internal diameter of the first end of the first PIP bulkhead;

(c) a second PIP pipeline length, the second PIP pipeline length comprising a metal inner pipe, an outer pipe, and an annular space thereinbetween, the inner metal pipe having an internal diameter;

(d) a second PIP bulkhead having a first end connected to an end of the second PIP pipeline length and comprising at least a metal inner pipe with a first internal diameter, an outer pipe, and an annular space thereinbetween, and a second end comprising an outer pipe with a second internal diameter, and is joined to the second end of the first PIP bulkhead, wherein the second internal diameter of the second PIP bulkhead is greater than the first internal diameter of the first end of the second PIP bulkhead; and (e) a sleeve at least partly located within the outer pipe of the second end of the first PIP bulkhead, and having a sleeve internal diameter being the same or similar to the internal diameter of the metal inner pipe of the first PIP pipeline length, and having two circumferential shoulders and a recess between the shoulders, at least one shoulder being within the second end of the first PIP bulkhead, and at least one shoulder being beyond the end of the second end of the first PIP bulkhead.

18. A pipe-in-pipe (PIP) pipeline assembly as claimed in claim 17 wherein the first and second PIP pipeline lengths are reelable pipelines, and wherein the first reelable PIP pipeline length is provided from a first reel, and the second reelable PIP pipeline length is provided from a second reel.

19. A pipe-in-pipe (PIP) pipeline assembly as claimed in claim 17 wherein one PIP pipeline length is connected to a termination.

20. A pipe-in-pipe (PIP) pipeline assembly as claimed in claim 17 wherein the sleeve is a pigging sleeve.

21. A method of connecting first and second PIP pipeline lengths to form a pipe-in-pipe (PIP) pipeline for laying in a marine environment comprising:

(a) providing the first and second PIP pipeline lengths, each comprising at least metal inner and outer pipes and an annular space thereinbetween, the inner metal pipe having an internal diameter, and each being attached to a PIP bulkhead having a first end comprising at least metal inner and outer pipes and an annular space thereinbetween and connected to an end of a respective PIP pipeline, and having a second end comprising an outer pipe able to be joined to a second end of a second PIP bulkhead, an internal diameter of the second end being greater than an internal diameter of the first end of the PIP bulkhead;

(b) connecting the second ends of the outer pipes of the PIP bulkheads;

(c) providing a sleeve having a sleeve internal diameter being the same or similar to the internal diameter of the metal inner pipe of the first PIP pipeline length, and having two circumferential shoulders and a recess between the shoulders, at least one shoulder being within the second end of the first PIP bulkhead, and at least one shoulder being beyond the end of the second end of the first PIP bulkhead; and (d) locating the sleeve in the outer pipes of the second ends of the PIP bulkheads prior to step (b), such that one sleeve shoulder is within the second end of the first PIP bulkhead, and the at least one sleeve shoulder is within the end of the second end of the second PIP bulkhead to form an annular space between the sleeve, the two shoulders of the sleeve, and the second ends of the first and second PIP bulkheads.

22. A method as claimed in claim 21 further comprising the step of purging the annular space between the two shoulders of the sleeve, the recess between the shoulders, and the second ends of the first and second PIP bulkheads prior to connecting the second ends of the outer pipes of the PIP bulkheads.

23. A method as claimed in claim 22 further comprising the steps of:

locating a purging dam in the sleeve;

forming a passageway for a purging gas between the second ends of the first and second PIP bulkheads into the purging dam; and passing a purging gas through the passageway into the purging dam, through purging holes in the sleeve, and into the recess between the shoulders of the sleeve either prior to, or during, or both, step (b) of connecting the second ends of the outer pipes of the PIP bulkheads together.

24. A method as claimed in claim 21 wherein the first and second PIP pipelines lengths are reelable PIP pipeline lengths, and a free end of the first reelable PIP pipeline length is provided from an end of a first reel, and a free end of the second reelable PIP pipeline length is provided from a beginning of a second reel.

* * * * *